United States Patent [19]

Manche

[11] 4,333,341
[45] Jun. 8, 1982

[54] DETERMINATION OF THE ACCELERATION OF GRAVITY

[76] Inventor: Emanuel P. Manche, 33 Edwards La., Glen Cove, N.Y. 11542

[21] Appl. No.: 157,662

[22] Filed: Jun. 9, 1980

[51] Int. Cl.$^3$ ............................................... G01V 7/14
[52] U.S. Cl. .................................................. 73/382 R
[58] Field of Search ............ 73/382 R, 382 G, 516 R, 73/516 LM

[56] References Cited

U.S. PATENT DOCUMENTS 2,137,963  11/1938  Heiland ............................ 73/382 R
2,641,458  6/1953  Gilvarry et al. .................. 73/517 R
3,011,347  12/1961  Boitnott ............................ 73/382 G Primary Examiner—James J. Gill

[57] ABSTRACT

A highly compact and portable free-fall apparatus for the absolute determination of the acceleration of gravity, which allows for rapid, convenient and precise measurements. The apparatus utilizes mercury as the falling mass and has design features that makes it possible to carry out experiments in vacuum or various gaseous environments under controllable conditions of temperature and pressure. The apparatus conveniently and automatically generates a large number of data in a relatively short period of time allowing for meaningful statistical analysis.

3 Claims, 3 Drawing Figures

DETERMINATION OF THE ACCELERATION OF GRAVITY

This invention relates to the absolute determination of the acceleration of gravity and, more particularly, to a method that is rapid, convenient and precise. While being relatively noncomplex in design, it is especially suitable for laboratory demonstration or experimentation on the subject of gravity. Specifically, this invention consists of a highly compact and portable free-fall apparatus that conveniently and automatically generates a large number of data in a relatively short period of time, the results of which show a high degree of precision. Further, the apparatus has design features that make it possible to carry out experiments in vacuum or various gaseous environments under controlled condition of temperature and pressure. It utilizes mercury as the falling mass.

In conventional free-fall apparatuses typically used in school laboratories for the experimental determination of the acceleration of gravity, g, a steel ball is dropped a known distance and the time it takes to travel from the rest position to the final position is measured. The value for g is then calculated from the equation: $g=2s/t^2$, where s is the distance of fall and t the time of fall in a vacuum. The measured value must be corrected for several instrumental effects in addition to natural ones. The most troublesome of these is the uncertainty associated with the conditions at the "start" and "stop" of the falling mass. The usual practice is to use electromechanical switches which ordinarily take a finite time to energize and deenergize an electrically operated clock. The value for the gravitational acceleration depends on the square of the time, which time is of the order of only a few tenths of a second for typical apparatuses. As a consequence, large errors in the calculated values for g result. Furthermore, these apparatuses are operated in air and not readily adaptable to studies under vacuum, controlled gas atmosphere or temperatures.

It is, therefore, a primary object of this invention to provide an improved apparatus for the absolute determination of the acceleration of gravity primarily for instructional purposes.

Another object is to provide an apparatus capable of carrying out a large number of experiments in a relatively short period of time, (minutes), allowing meaningful statistical treatment of the data.

Another object is to provide an apparatus that is capable of increased speed of analysis.

Another object is to provide an apparatus that can be used to easily carry out experiments in vacuum or in controlled gas atmospheres.

Another object is to provide an apparatus that can easily allow experiments to be carried out at various gas temperatures and pressures.

Another object is to provide a highly compact and portable apparatus that retains its calibration after relocation.

Another object is to provide an apparatus that automatically generates a large number of falling spheres.

Another object is to provide an apparatus that is simple to operate and economical to maintain.

Another object is to provide an apparatus that is very precise.

The manner in which the above objects are achieved will be more apparent from the following description, the appended claims and example, and the figures of the attached drawings wherein:

Figure 1:
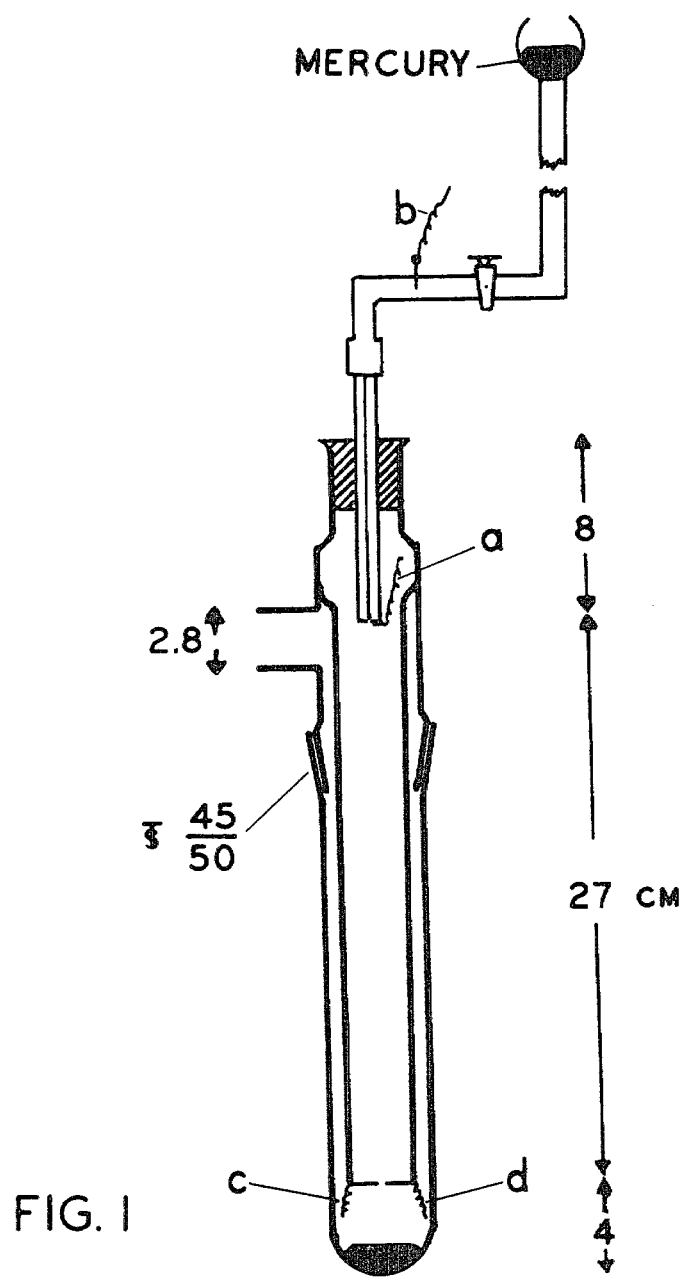
FIG. 1 is a schematic diagram of a falling mercury drop apparatus in accordance with the invention.
Figure 2:
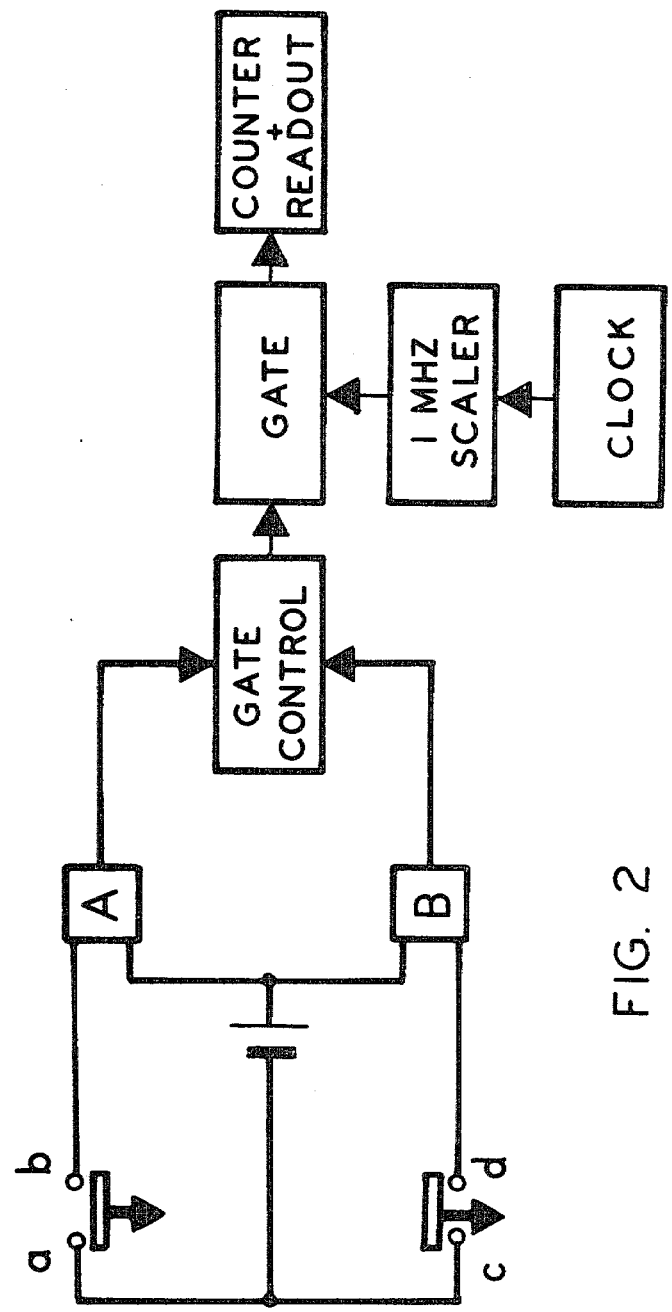
FIG. 2 is a schematic diagram of the timing circuit.

The apparatus consists of a falling-mercury unit made of glass as shown in FIG. 1, and an electronic timing circuit as shown in FIG. 2. The apparatus of FIG. 1 was constructed from pyrex tubing with ground glass joints having a 1:10 taper. The "outer" part is sealed at the bottom while the "inner" part has a shield tube sealed to it. Near the top is an opening which serves as an outlet for attaching a vacuum pump or as an inlet for the introduction of gases when studies of the effects of different gaseous environments are desired. It also serves as a viewing port, a convenience during the initial set up. At the top of the apparatus, a glass capillary, 5-15 cm long, with an internal diameter of the order of 0.01 cm or less, is held in a central position by a stopper; the top of the capillary being connected to a mercury reservoir through a short length of glass tubing with a stopcock assembly made of teflon. On the capillary side of this assembly, a piece of platinum wire is welded through the glass tube and is used as one of the contact leads for the "start" switch. On the other side of this assembly is a leveling bulb. At the tip of the capillary a piece of rigid steel wire, 0.017-cm diam, is carefully positioned so that it terminates near the bore to act as the "start" switch. At the bottom of the shield tube, two more pieces of steel wire are positioned to form a gap approximately 0.03 cm, the aperture made to coincide with the center of the capillary. The wires form the "stop" switch.

The timing circuit is schematically shown in FIG. 2. The time is measured in the interval bounded by the A-B signals. A 4-MHz temperature compensated crystal oscillator forms the basis for a 1-MHz signal from the scaler for the timing output. Comparator "A" is set to trigger on a positive slope, i.e., while the drop is hanging, the switch is closed and the signal is at $-1.5$ V. The moment the drop leaves the capillary, the switch opens and the signal goes to zero, thus starting the gate interval. Comparator B, on the other hand, is set to trigger on a negative slope, i.e., when the mercury drop reaches the terminal point, the switch is momentarily closed with the signal going from 0 to $-1.5$ V, completing the gate interval. Immediately thereafter, the circuit is automatically ready for another cycle. This feature allows one to gather hundreds of data points in a matter of minutes depending, of course, on the rate of drop fall which, in a limited way, is controlled by the height of the mercury reservoir.

Proper initial alignment of the apparatus is essential. Once this critical procedure has been carried out on a level base, the apparatus is ready for experiments in air. After several thousands drops, the mercury is removed from the bottom reservoir by simply removing the "outer" chamber and transferring it to the reservoir. Replacement of the "outer" chamber does not disturb the alignment.

The analysis of drop formation is as follows. The rate of flow of mercury through the capillary is given by Poisseuille's equation $$v = \pi p r^4 / 8\iota\eta, \tag{1}$$

where v is the volume flow rate (cm³/sec), r is the capillary radius (cm), $\eta$ is the viscosity of mercury ($1.554 \times 10^{-2}$ dynsec cm⁻²), l is the capillary length (cm), and p is the pressure forcing the mercury through the capillary ($1.3332 \times 10^4$ h dyn cm⁻²), where h is the height of mercury column in cm above the capillary tip. Using the value for the density of mercury at 20° C. (13.5462 gcm⁻³), an approximate equation can be derived for the mass rate of mercury flow m' (gm sec⁻¹) which can be reduced to the following form:

$$m' = 4.56 \times 10^6 (r^4/l) h. \tag{2}$$

For any one capillary chosen, since r and l are obviously constant, Eq. (2) can be written in the form $$m' = kh. \tag{3}$$

Further, at constant temperature, the product of the mass, m, (gm) and the time(sec) which elapses between the fall of one drop and that of the next, tb, is constant and independent of the height of the mercury column. Thus, the approximate time between drops may be calculated, since the drops leave the capillary when they achieve a mass m which is fairly constant for all drops. Then $m = m'tb$, so that $tb = m/kh$, and the time between drops is inversely proportional to h. A knowledge of tb is not essential to the calculation of the acceleration, g, but control of tb through the adjustment of h is useful in the actual performance of the experiment. From geometric considerations, the radius of the mercury sphere can be calculated from the following equation:

$$R = 0.260 m^{\frac{1}{3}}, \tag{4}$$

where R and m have units of cm and gm, respectively.

EXAMPLE

Figure 3:
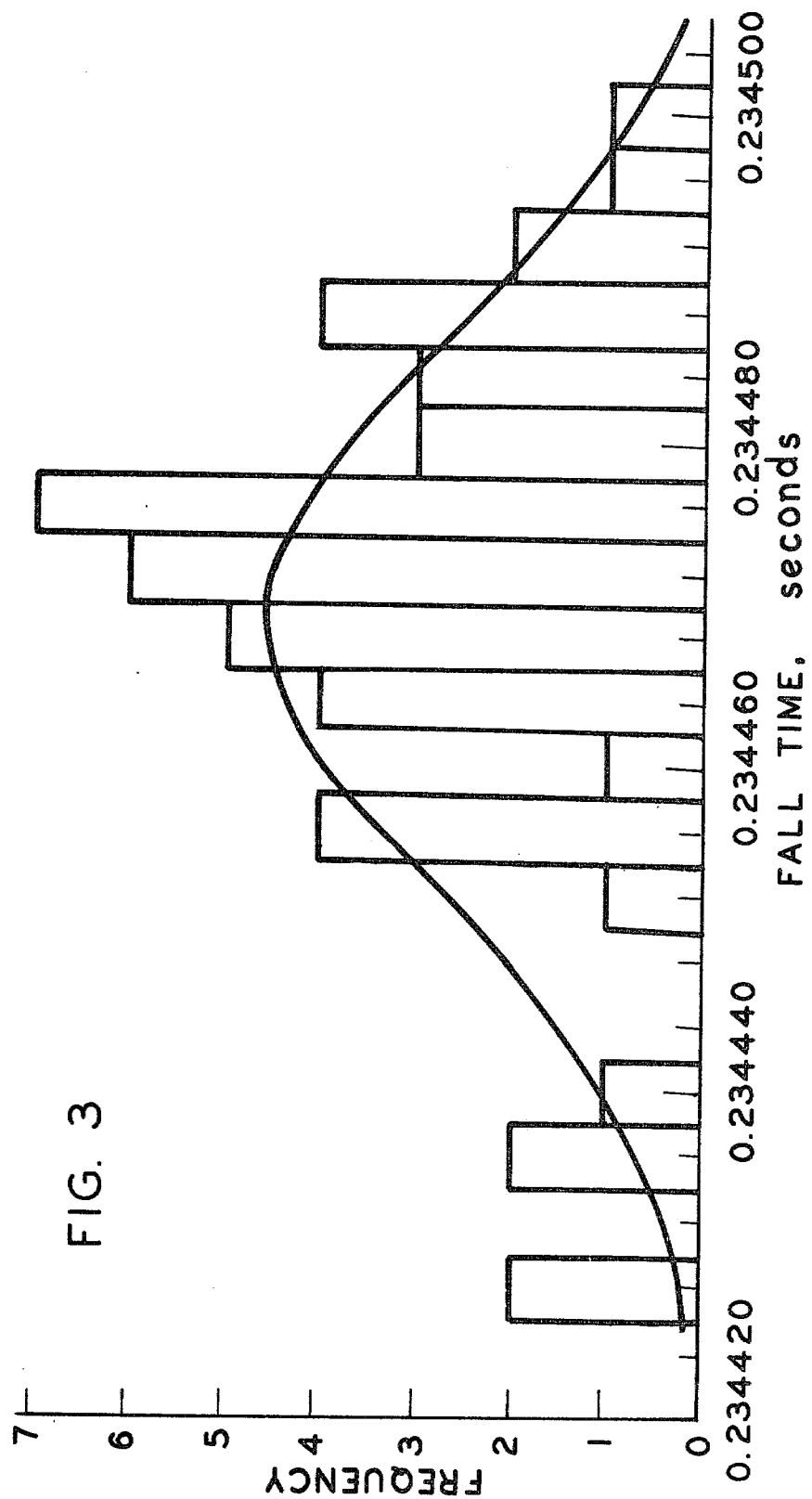
FIG. 3 is a histogram and normal curve illustrating the results of a typical experiment obtained using the apparatus of the present invention.

An experiment was carried out with this apparatus whereby the time interval for 47 successive drops was measured in a capillary 14 cm long having an average bore radius of 0.0051 cm. The mercury reservoir was raised to a level so that a drop rate of one every 6 sec was achieved. The distance of fall, s, after appropriate corrections, measured 26.971 cm. The average time of fall, t, was $0.234470 \pm 0.000017$ sec with a standard deviation of the mean of $\pm 3$ μsec. The distribution of fall times for this experimental run is illustrated in FIG. 3.

All linear measurements were carried out with a cathetometer capable of reading to 0.003 cm.[1] The time intervals were measured in microseconds, the apparatus having a long-term stability of 1 ppm/yr and a short-term frequency stability of $\pm 5 \times 10^{-9}$/sec.[2]

[1]. A cathetometer was assembled by mounting a telescope on a Schorr-Tumico height gauge with a vernier scale to 0.001 in.
[2]. Health Universal Digital Instrument, Model EU-805, was used in this work.

According to this data, the value for g, calculated from $g = 2s/t^2$, is $981.19 \pm 0.14$ cm sec⁻². However, this value must be corrected for the effect of aerodynamic drag. g can be conveniently obtained to a good approximation from the following equation[3,4].

$$g \simeq (2s/t^2)[1 + (s/16R)(\rho a/\rho)], \tag{5}$$

where s is the distance through which the mercury mass has fallen after time t, R is its radius, and $\rho$ and $\rho a$ are the densities of mercury and air, respectively. The corrected value for g is calculated to be 982.44 cm sec⁻², with a standard deviation of the mean of $\pm 0.02$ cm sec⁻². This value is to be compared with the "true" value of g at latitude $\theta = 40°42'$. This value is calculated from the "international gravity formula" at sea level[5]

$$g = 978.0495[1 + 0.005289 \sin^2 \theta - 0.0000073 \sin^2 2\theta], \tag{6}$$

to be 980.242 cm sec⁻². Comparison of the experimental value with this value shows an accuracy of 0.22%..

[3]. For the present approximation, h is taken as the hydrostatic pressure of the mercury column. The relatively small "back" pressure which reflects the interfacial tension between the mercury drop and the surrounding fluid has been neglected.
[4]. J. A. Blackburn and R. Koenig, Am. J. Phys. 44, 855 (1976).
[5]. Smithsonian Physical Tables, 9th ed., edited by W. E. Forsythe (Smithsonian Institution, Washington, D.C., 1954). p. 714.

Calculations of g in Eq. (5) was made using R from Eq. (4), where the value for the mass was obtained from the average of 20 drops that were collected and weighed on an analytical balance.

The apparatus, as described, can be used in an undergraduate physics laboratory where each student can gather the time of 50 free falls in a span of approximately 5 min from a set up that is in continuous operation during the laboratory session. The vertical drop s can be determined with a cathetometer even when someone else is gathering data with the apparatus or the value can be permanently marked on the apparatus. This experiment yields data that lends well to an understanding of the indeterminate/determinate type of errors associated with the concept of precision and accuracy. The effect of aerodynamic drag in the determination of g can be easily shown by carrying out the experiment in air as well as in another gas with a different density. For example, the difference in time of fall that should result from two experiments, one carried out in air and the other in hydrogen, can be calculated from the following equation:

$$t \simeq \{(2s/g)[1 + (s/16R)(\rho g/\rho)]\}^{\frac{1}{2}}. \tag{7}$$

where $\rho g$ is now the density for each gas used. In this case, a difference of 138 μsec would be realized.

This invention is to be construed as limited only by the following claim.

I claim:
1. An apparatus for measuring the acceleration of gravity comprising:
    an elongated container, mounted with its longitudinal axis vertical, and having an opening in its top;
    a capillary tube extending through the opening in the top and being vertically adjustable so that the distance between the end of the tube within the container and bottom of the container may be varied;
    a reservoir containing mercury connected to the other end of the capillary tube by a conduit providing a pressure head at the other end of the capillary;
    means for varying the pressure head;
    means for sensing departure of a drop of mecury from the end of the tube within the container and sensing arrival of the drop at a fixed point a known distance from the end of the tube; and
    means for measuring the time interval between the departure and arrival of the drop of mecury.
2. An apparatus as set forth in claim 1 wherein the container has an opening in its side for connection to a source vacuum or a controlled gas environment.
3. An apparatus as set forth in claim 1 wherein the bottom of the container is removable to allow recycling of the mercury without disturbing the positions of the capillary tube or sensing means.

* * * * *